(12) United States Patent
Wang

(10) Patent No.: US 8,274,737 B2
(45) Date of Patent: Sep. 25, 2012

(54) RETRACTABLE FRAME OF PROJECTION SCREEN

(75) Inventor: Shih-Jen Wang, New Taipei (TW)

(73) Assignee: Bright Supply Corp., New Taipei (TW)

( * ) Notice: Subject to any disclaimer, the term of this patent is extended or adjusted under 35 U.S.C. 154(b) by 0 days.

(21) Appl. No.: 13/310,760

(22) Filed: Dec. 4, 2011

(65) Prior Publication Data
US 2012/0140318 A1    Jun. 7, 2012

(30) Foreign Application Priority Data
Dec. 6, 2010  (TW) ................ 99223693 U

(51) Int. Cl.
*G03B 21/14*    (2006.01)

(52) U.S. Cl. ........................ 359/461; 359/443

(58) Field of Classification Search .......... 160/351, 160/371–381, 238–326; 248/683; 359/443, 359/461
See application file for complete search history.

(56) References Cited

U.S. PATENT DOCUMENTS

| | | | | | |
|---|---|---|---|---|---|
| 1,688,010 | A | * | 10/1928 | Godske | 248/278.1 |
| 2,395,303 | A | * | 2/1946 | Stableford | 160/24 |
| 3,592,255 | A | * | 7/1971 | Potter et al. | 160/24 |
| 3,822,848 | A | * | 7/1974 | Hopkins | 248/279.1 |
| 3,841,594 | A | * | 10/1974 | Zinn | 248/169 |
| 3,868,078 | A | * | 2/1975 | Zinn | 248/171 |
| 4,042,028 | A | * | 8/1977 | Ennes et al. | 160/263 |
| 4,068,921 | A | * | 1/1978 | Okumura | 359/461 |
| 4,252,172 | A | * | 2/1981 | Pommat et al. | 160/322 |
| 4,399,857 | A | * | 8/1983 | Honma | 160/323.1 |
| D323,338 | S | * | 1/1992 | Court | D16/241 |
| 5,653,278 | A | * | 8/1997 | Cheng | 160/370.22 |
| 5,706,130 | A | * | 1/1998 | Rosen | 359/443 |
| 5,921,305 | A | * | 7/1999 | Grudl | 160/66 |
| 6,046,845 | A | * | 4/2000 | Niwa et al. | 359/443 |
| 6,052,227 | A | * | 4/2000 | Niwa et al. | 359/461 |
| 6,378,594 | B1 | * | 4/2002 | Yamanaka et al. | 160/238 |
| 6,467,714 | B1 | * | 10/2002 | Rasmussen | 242/381 |
| 6,552,847 | B2 | * | 4/2003 | Congard | 359/445 |
| 6,843,301 | B2 | * | 1/2005 | Carrillo et al. | 160/310 |
| 6,873,458 | B1 | * | 3/2005 | Bakkom et al. | 359/443 |
| 7,129,657 | B2 | * | 10/2006 | Cavarec et al. | 318/280 |
| 7,178,790 | B2 | * | 2/2007 | de Lorenzo | 256/59 |
| 7,203,000 | B2 | * | 4/2007 | Kotera | 359/461 |
| 7,405,876 | B2 | * | 7/2008 | Choi | 359/461 |
| 7,489,444 | B1 | * | 2/2009 | Adams et al. | 359/461 |
| 7,602,549 | B2 | * | 10/2009 | Yamauchi | 359/449 |
| 7,706,066 | B2 | * | 4/2010 | Adams et al. | 359/443 |
| 7,730,930 | B2 | * | 6/2010 | Malausa et al. | 160/310 |

(Continued)

*Primary Examiner* — Clayton E LaBalle
*Assistant Examiner* — Kevin Butler
(74) *Attorney, Agent, or Firm* — GUICE PATENTS PLLC

(57) ABSTRACT

The present invention provides a retractable frame of a projection screen, which comprises: a receiving case; a rolling shaft; a rolling device; a first support rod having one end laterally extended with an engaging plate having a plate hole, two opposing sides of the engaging plate respectively having an engaging surface; a second support rod having one end extended with two engaging arms, and each engaging arm having an engaging hole; a combination member connected with the second support rod and the first support rod; a top supporter; and a projection screen. When being unfolded, the top supporter is upwardly pulled till the connection location of the second support rod and the first support rod being approximately a line, so the engaging arms can be tightly abutted against the end portions of the engaging surfaces for achieving the objective of support.

11 Claims, 5 Drawing Sheets

U.S. PATENT DOCUMENTS

| | | | |
|---|---|---|---|
| 7,830,600 B2 * | 11/2010 | Jiang | 359/461 |
| 7,864,418 B2 * | 1/2011 | Kuroi et al. | 359/443 |
| 7,889,424 B2 * | 2/2011 | Suteau | 359/443 |
| 7,985,157 B2 * | 7/2011 | Yang | 475/260 |
| 8,031,400 B2 * | 10/2011 | Wang et al. | 359/461 |
| 8,107,166 B2 * | 1/2012 | Tsai Chen | 359/461 |
| 2002/0048083 A1 * | 4/2002 | Okumura | 359/461 |
| 2002/0051289 A1 * | 5/2002 | Congard | 359/443 |
| 2004/0045683 A1 * | 3/2004 | Carrillo et al. | 160/310 |
| 2005/0205224 A1 * | 9/2005 | Dalle Nogare et al. | 160/321 |
| 2006/0209406 A1 * | 9/2006 | Choi | 359/461 |
| 2006/0232233 A1 * | 10/2006 | Adams et al. | 318/280 |
| 2006/0279840 A1 * | 12/2006 | Yamauchi | 359/461 |
| 2007/0217006 A1 * | 9/2007 | Ragni | 359/461 |
| 2008/0196845 A1 * | 8/2008 | Zangirolami | 160/291 |
| 2009/0139668 A1 * | 6/2009 | Naylor | 160/310 |
| 2009/0141348 A1 * | 6/2009 | Maruta et al. | 359/449 |
| 2009/0190212 A1 * | 7/2009 | Wang et al. | 359/461 |
| 2009/0268285 A1 * | 10/2009 | Suteau | 359/443 |
| 2009/0283224 A1 * | 11/2009 | Kim | 160/241 |
| 2009/0318258 A1 * | 12/2009 | Yang | 475/343 |
| 2011/0026114 A1 * | 2/2011 | Abe et al. | 359/461 |
| 2011/0073262 A1 * | 3/2011 | Frede | 160/309 |
| 2011/0199678 A1 * | 8/2011 | Kuroi | 359/461 |
| 2011/0203754 A1 * | 8/2011 | Mullet et al. | 160/405 |
| 2011/0272106 A1 * | 11/2011 | Mullet et al. | 160/311 |
| 2012/0024485 A1 * | 2/2012 | Mullet et al. | 160/313 |

* cited by examiner

RETRACTABLE FRAME OF PROJECTION SCREEN

BACKGROUND OF THE INVENTION

1. Field of the Invention

The present invention relates to a retractable frame of a projection screen, especially to a retractable frame of a projection screen having advantages of small volume, light weight and low production cost.

2. Description of Related Art

Generally, a projector or OLED TV projects the image signals to a large-dimension display panel or projection screen for obtaining a better video/audio and visual effect. A conventional retractable frame of a projection screen is often installed with a plurality of support rods which are staggeringly arranged, and two support rods at the bottom are respectively provided with a retractable rod; so with the two retractable rods, the support to the projection screen can be reinforced and the unfolding/folding operation can be facilitated.

However, the mentioned retractable frame of the projection screen requires a considerable number of support rods and the two retractable rods to achieve the effect of reinforcing the support to the projection screen, therefore the volume and weight are inevitably increased and the production cost is raised.

As such, a novel retractable frame of a projection screen shall be invented for improving the mentioned shortages.

SUMMARY OF THE INVENTION

One primary objective of the present invention is to provide a retractable frame of a projection screen having advantages of small volume, light weight and low production cost.

For achieving the mentioned objective, the retractable frame of the projection screen comprises: a receiving case having an accommodation space, a first end part and a second end part; a rolling shaft disposed in the receiving case; a rolling device disposed in the receiving case and one end thereof being installed at the first end part and the other end being connected in the rolling shaft; a first support rod having one end connected inside or outside of the receiving case and the other end laterally extended with an engaging plate having a plate hole, wherein two opposing sides of the engaging plate respectively having an engaging surface; a second support rod having one end extended with two engaging arms corresponding to the engaging plate, and each engaging arm having an engaging hole; a combination member passing through the engaging holes and the plate hole and connected with the first support rod and the second support rod; a top supporter allowing the other end of the second support rod to be connected thereon; and a projection screen having its two ends respectively connected on the top supporter and the rolling shaft so as to be rolled on the rolling shaft by the rolling device.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
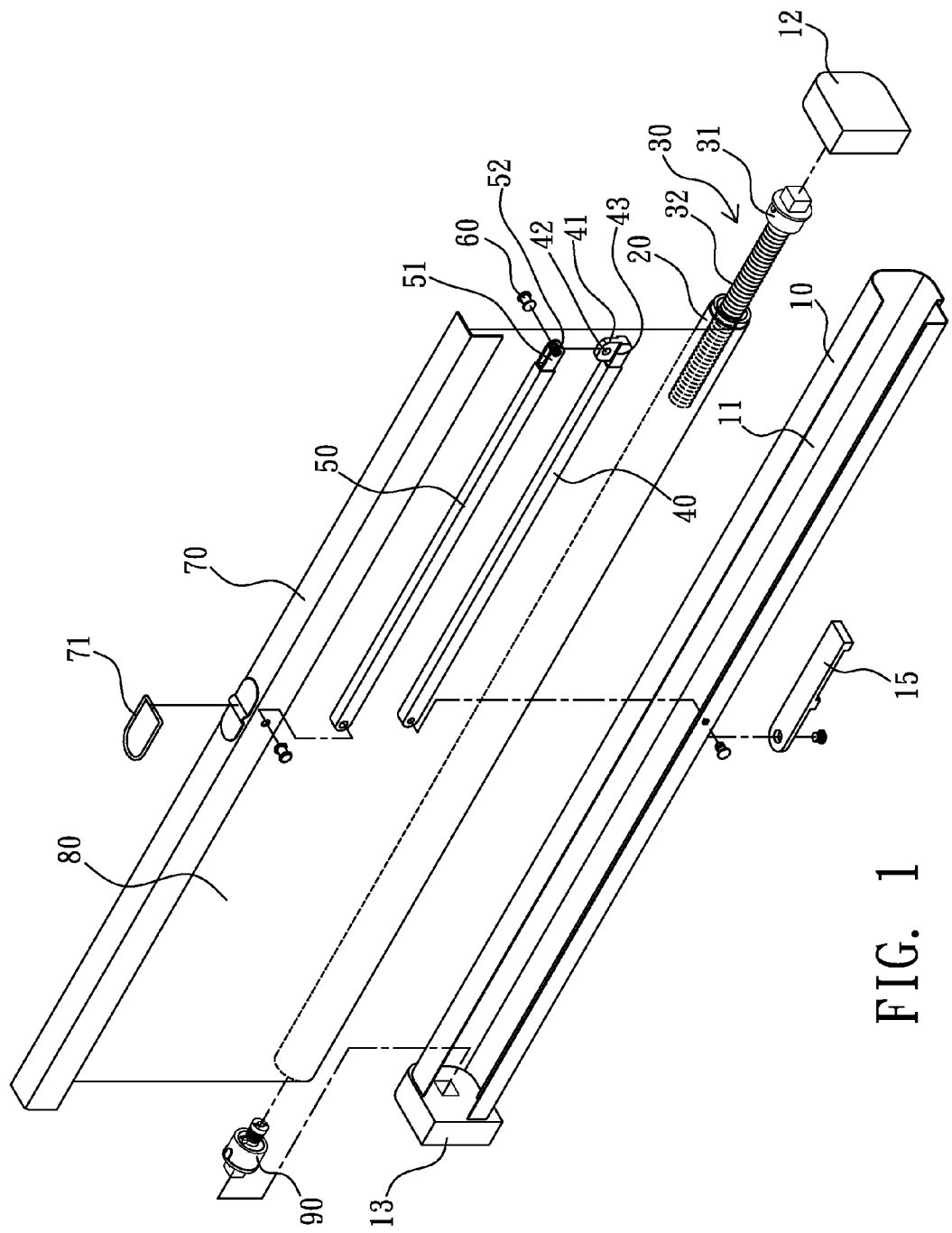
FIG. 1 is a schematic exploded view illustrating the retractable frame of the projection screen, according to one preferred embodiment of the present invention.
Figure 2:
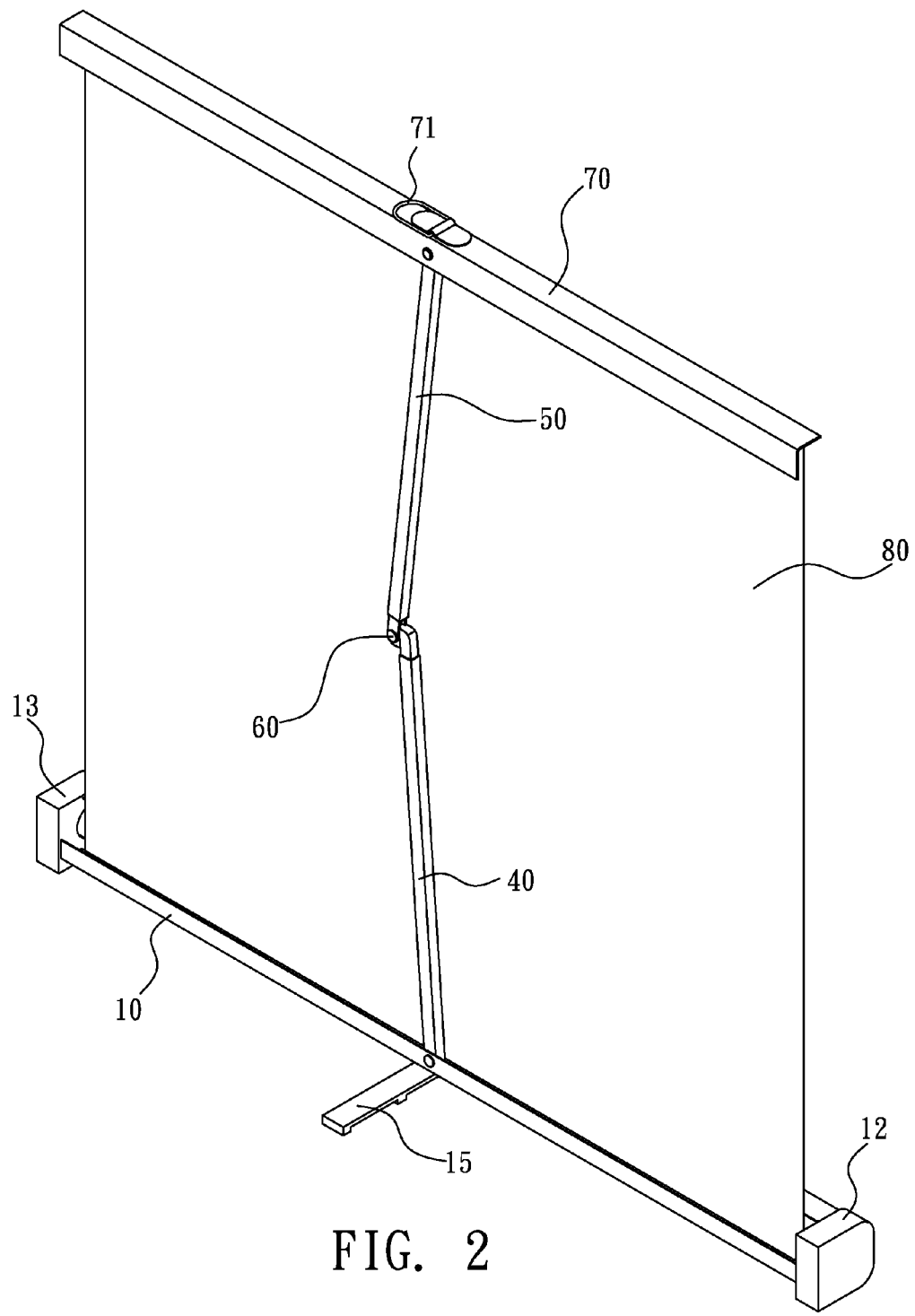
FIG. 2 is a schematic perspective view illustrating the retractable frame of the projection screen being in an unfolding state, according to one preferred embodiment of the present invention.
Figure 3:
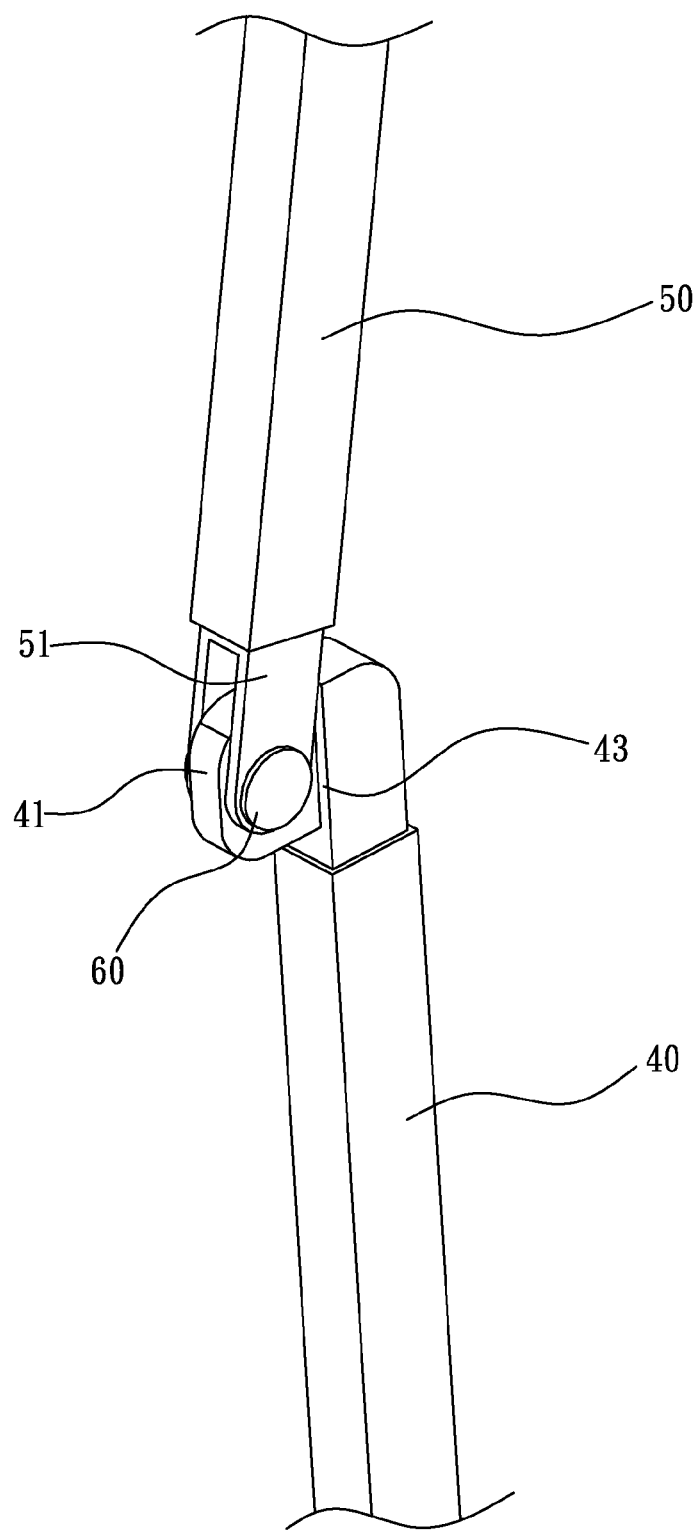
FIG. 3 is a partially enlarged view illustrating the combination of the first support rod, the second support rod and the combination member, according to one preferred embodiment of the present invention.
Figure 4:
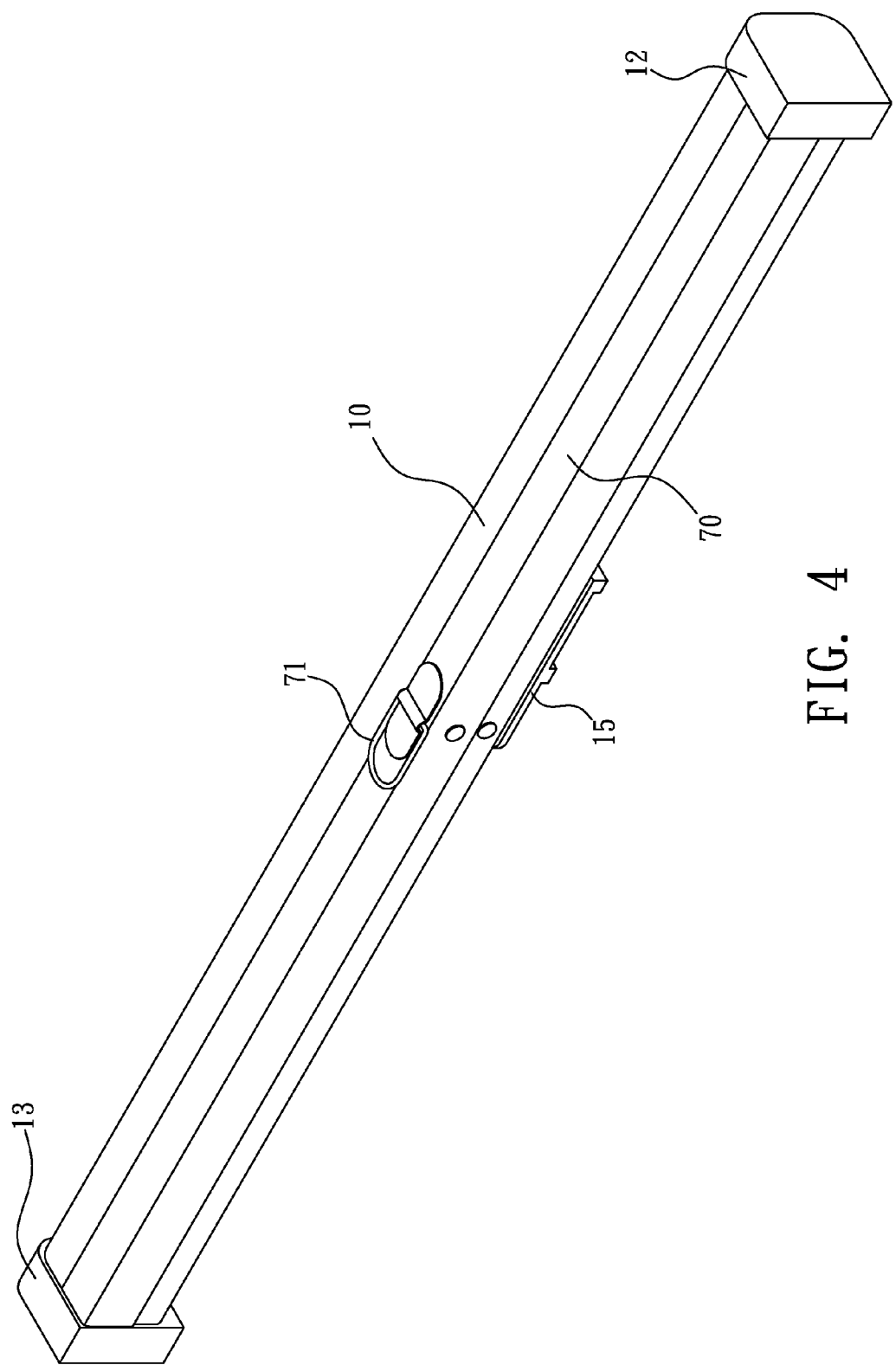
FIG. 4 is a schematic view illustrating the retractable frame of the projection screen being in a folding state, according to one preferred embodiment of the present invention.
Figure 5:
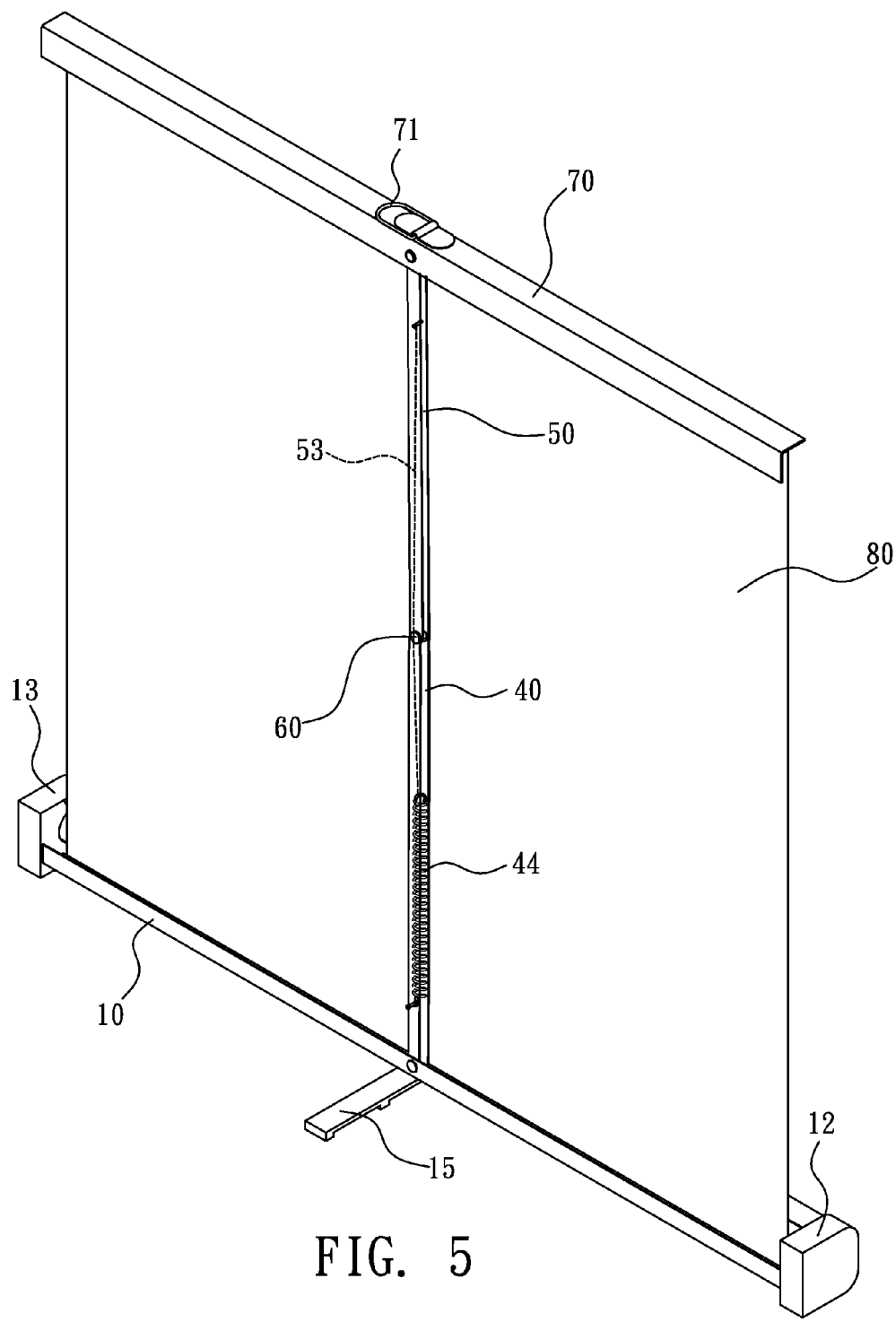
FIG. 5 is a schematic view illustrating the first support rod being further comprised with a spring, according to one preferred embodiment of the present invention.

The accompanying drawings are included to provide a further understanding of the invention, and are incorporated in and constitute a part of this specification. The drawings illustrate embodiments of the invention and, together with the description, serve to explain the principles of the invention, wherein FIG. 1 is a schematic exploded view showing the retractable frame of the projection screen, according to one preferred embodiment of the present invention; FIG. 2 is a schematic perspective view showing the retractable frame of the projection screen being in an unfolding state, according to one preferred embodiment of the present invention; FIG. 3 is a partially enlarged view showing the combination of the first support rod, the second support rod and the combination member, according to one preferred embodiment of the present invention; FIG. 4 is a schematic view showing the retractable frame of the projection screen being in a folding state, according to one preferred embodiment of the present invention; and FIG. 5 is a schematic view showing the first support rod being further comprised a spring, according to one preferred embodiment of the present invention.

As shown in figures, the retractable frame of a projection screen provided by the present invention comprises: a receiving case 10; a rolling shaft 20; a rolling device 30; a first support rod 40; a second support rod 50; a combination member 60; a top supporter 70; and a projection screen 80.

The receiving case 10 comprises an accommodation space 11, a first end part 12 and a second end part 13; when being in a folding state, the receiving case 10 can accommodate the rolling shaft 20, the rolling device 30, the first support rod 40, the second support rod 50, the combination member 60, the top supporter 70 and the projection screen 80. The receiving case 10 is preferably made of a metal material.

The rolling shaft 20 is disposed in the receiving case 10, and made of, for example but not limited to, a metal or plastic material.

The rolling device 30 is disposed at the other end of the receiving case 10, and further comprises a driven device 31 and a spring 32, wherein one end of the driven device 31 is installed in the first end part 12, one end of the spring 32 is connected on the driven device 31 while the other end being connected in the rolling shaft 20.

The first support rod 40 is hollow and one of its side wall comprises a slot (figure not shown), for example but not limited to the right side wall, and one end thereof is connected inside or outside of the receiving case 10, the other end is laterally extended with an engaging plate 41 having a plate hole 42, wherein two opposing sides of the engaging plate 41 are respectively formed with an engaging surface 43, and the first support rod 40 is made of, for example but not limited to, a metal material.

The second support rod 50 is hollow and one of its side wall also comprises a slot (figure not shown), for example but not limited to the right side wall, one end thereof is extended with two engaging arms 51 corresponding to the engaging plate 41, and each engaging arm 51 is formed with an engaging hole 52, wherein the second support rod 50 is made of, for example but not limited to, a metal material.

The combination member 60 can pass through the engaging holes 52 and the plate hole 42 and is connected with the first support rod 40 and the second support rod 50. Wherein, the combination member 60 is, for example but not limited to, a screw or rivet; in this embodiment, a rivet is adopted for illustration and shall not be seen as a limitation for the scope of the present invention.

The top supporter 70 allows the other end of the second support rod 50 to be connected thereon, and the top supporter 70 is made of, for example but not limited to, a metal material. Moreover, the top supporter 70 further comprises a pull ring 71.

The projection screen 80 has its two ends respectively connected on the top supporter 70 and the rolling shaft 20, thereby being able to be rolled on the rolling shaft 20 by the rolling device 30. Wherein the projection screen is a high gain projection screen, which is a conventional art, thus no further illustration is provided.

In addition, the bottom of the receiving case 10 further comprises a foot stand 15 capable of rotating to be approximately perpendicular to the receiving case 10, so as to support the retractable frame of the projection screen.

As shown in FIG. 2 and FIG. 3, when the retractable frame of the projection screen provided by the present invention is desired to be unfolded, the pull ring 71 is utilized to upwardly pull the top supporter 70 till the connection location of the second support rod 50 and the first support rod 40 being approximately a line, such that the engaging arms 51 can be tightly abutted against the end portions of the engaging surfaces 43. When the retractable frame moves between closed and open positions, the first support rod 40 and the second support rod 50 pivot in a common plane.

Moreover, according to the present invention, the retractable frame of the projection screen further comprises a rolling buffer device 90 having one end sleeved with the other end of the rolling shaft 20 and the other end connected at the second end part 13, wherein, the rolling buffer device is filled with a visco-elastic material (not shown in figures); so with the visco-elastic material, the rotation speed can be reduced thereby lowering the impact force generated while folding.

As shown in FIG. 4, when the retractable frame of the projection screen is desired to be folded, a force is applied to push the engaging plate 41, the engaging arms 51 are released from the end portions of the engaging surfaces 43, and the second support rod 50 is no longer supported, thus the top supporter 70 can be downwardly pulled by the recovery force provided by the spring 32, thereby storing the projection screen 80, the top supporter 70, the second support rod 50, the first support rod 40 and the combination member 60 in the accommodation space 11. As such, the retractable frame of the projection screen provided by the present invention has advantages of less components, smaller volume, and easier operation, when comparing to the conventional retractable frame of a projection screen.

Referring to FIG. 5, which is a schematic view showing the first support rod being further comprised a spring, according to one preferred embodiment of the present invention. As shown in FIG. 5, the first support rod 40 further comprises a spring 44 disposed through the slot having one end connected on the end part of the first support rod 40 and the other end connected in the second support rod 50. As an alternative, the spring 44 can also be disposed in the second support rod 50 through the slot, and one end thereof is connected on the end part of the second support rod 50 and the other end is connected in the first support rod 40; or two springs 44 are provided and disposed in the first support rod 40 and the second support rod 50 through the slot respectively, and a connection string 53 is connected therebetween, wherein the connection string 53 is, for example but not limited to, a metal string or nylon string. As such, with the elastic force and the recovery force of the spring 44, the retractable frame of the projection screen can be folded or unfolded.

As what is disclosed above, it is appreciated to summarized the retractable frame of the projection screen provided by the present invention has the advantages of small volume, light weight, and low production cost, which can obviously improve the shortages of the conventional retractable frame of a projection screen.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A retractable frame of a projection screen comprising:
   a receiving case having an accommodation space, a first end part and a second end part;
   a rolling shaft located in said receiving case;
   a rolling device located in said receiving case and a first end thereof connected to said first end part and a second end thereof connected in said rolling shaft;
   a first support rod having a first end directly connected to said receiving case and an engaging plate located on a second end of the first support rod and extending outwardly from a lateral side thereof, said engaging plate has a plate hole, wherein two opposing sides of said engaging plate respectively having an engaging surface;
   a second support rod having two engaging arms located on a first end thereof and corresponding to said engaging plate, and each engaging arm having an engaging hole corresponding to the plate hole of the first support rod, the engaging plate is located between the two engaging arms;
   a combination member passing through said engaging holes and said plate hole and connected with said first support rod and said second support rod;
   a top supporter connected to a second end of said second support rod; and
   a projection screen having a first end connected to said top supporter and a second end connected to said rolling shaft and being selectively rolled on said rolling shaft by said rolling device.

2. The retractable frame of the projection screen according to claim 1, wherein said combination member is is selected from a group consisting of a screw and a rivet.

3. The retractable frame of the projection screen according to claim 1, wherein the upper end of said top supporter further comprises a pull ring.

4. The retractable frame of the projection screen according to claim 1, wherein said rolling device further comprises a driven device and a spring, said driven device is connected to said first end part, a first end of said spring is connected to said driven device and a second end of said spring is connected to said rolling shaft.

5. The retractable frame of the projection screen according to claim 1, wherein a bottom of said receiving case further comprises a foot stand capable of being rotated between a parallel position and a perpendicular position relative to said receiving case for providing support.

6. The retractable frame of the projection screen according to claim 1, wherein said projection screen is a high gain projection screen.

7. The retractable frame of the projection screen according to claim 1, further comprising a rolling buffer device having a first end sleeved with the second end of said rolling shaft and a second end connected to said second end part, wherein said rolling buffer device is filled with a visco-elastic material; said visco-elastic material reducing a rotation speed of said rolling shaft thereby lowering an impact force generated while folding.

8. The retractable frame of the projection screen according to claim 1, wherein, when the retractable frame moves between closed and open positions, said first support rod and said second support rod pivot in a common plane.

9. The retractable frame of the projection screen according to claim 1, wherein said first support rod and said second support rod are hollow, and one side wall of said first support rod and one side wall of said second support rod further comprises a slot respectively.

10. The retractable frame of the projection screen according to claim 9, further comprising a spring located in said first support rod through said slot and a first spring end thereof being connected to an end part of said first support rod located adjacent to the first end of said first support rod and a second spring end thereof being connected to said second support rod.

11. The retractable frame of the projection screen according to claim 9, further comprising a spring located in said second support rod through said slot and a first spring end thereof being connected to an end part of said second support rod located adjacent to the second end of said second support rod and a second spring end thereof being connected to said first support rod.

* * * * *